United States Patent
Wang et al.

(10) Patent No.: US 10,528,620 B2
(45) Date of Patent: *Jan. 7, 2020

(54) COLOR SKETCH IMAGE SEARCHING

(71) Applicant: Microsoft Technology Licensing, LLC, Redmond, WA (US)

(72) Inventors: Changhu Wang, Beijing (CN); Avneesh Sud, Kirkland, WA (US); Lei Zhang, Bellevue, WA (US); Xinghai Sun, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 192 days.

This patent is subject to a terminal disclaimer.

(21) Appl. No.: 15/844,376

(22) Filed: Dec. 15, 2017

(65) Prior Publication Data
US 2018/0129658 A1 May 10, 2018

Related U.S. Application Data

(63) Continuation of application No. 14/898,117, filed as application No. PCT/CN2013/077211 on Jun. 14, 2013, now Pat. No. 9,875,253.

(51) Int. Cl.
*G06F 16/583* (2019.01)
*G06T 7/90* (2017.01)
(Continued)

(52) U.S. Cl.
CPC .... *G06F 16/5838* (2019.01); *G06F 16/24578* (2019.01); *G06F 16/532* (2019.01);
(Continued)

(58) Field of Classification Search
None
See application file for complete search history.

(56) References Cited

U.S. PATENT DOCUMENTS 9,875,253 B2   1/2018  Wang et al.
2002/0081024 A1  6/2002  Park et al.
(Continued)

FOREIGN PATENT DOCUMENTS

CN   100517328 C   8/2007
CN   101159064 A   4/2008
(Continued)

OTHER PUBLICATIONS

"Notice of Allowance Issued in U.S. Appl. No. 14/898,117", dated Sep. 19, 2017, 17 Pages.
(Continued)

*Primary Examiner* — Bernard Krasnic
(74) *Attorney, Agent, or Firm* — Schwegman Lundberg & Woessner, P.A.

(57) ABSTRACT

For each image in a collection of images to be searched, the image is represented as a collection of color-edge words, where each color-edge words includes location information, shape information, and color information. The images may be indexed based on the color-edge words. A user-generated sketch is received as a query and represented as a collection of color-edge words. The collection of color-edge words representing the sketch is compared to the image index to identify search results based on a combination of location similarity, shape similarity, and color similarity.

18 Claims, 12 Drawing Sheets

(51) Int. Cl.
G06F 16/532 (2019.01)
G06F 16/2457 (2019.01)
G06K 9/46 (2006.01)
G06K 9/62 (2006.01)
G06T 7/50 (2017.01)
G06T 7/13 (2017.01)

(52) U.S. Cl.
CPC ....... *G06F 16/5854* (2019.01); *G06K 9/4604* (2013.01); *G06K 9/6215* (2013.01); *G06T 7/13* (2017.01); *G06T 7/50* (2017.01); *G06T 7/90* (2017.01); *G06K 2009/6213* (2013.01); *G06T 2207/10024* (2013.01)

(56) References Cited

U.S. PATENT DOCUMENTS

| | | | |
|---|---|---|---|
| 2010/0277770 | A1 | 11/2010 | Yao |
| 2011/0235902 | A1 | 9/2011 | Chittar et al. |
| 2012/0054177 | A1 | 3/2012 | Wang et al. |
| 2012/0072410 | A1 | 3/2012 | Wang et al. |
| 2012/0162244 | A1 | 6/2012 | Ma et al. |
| 2013/0097181 | A1 | 4/2013 | Sud et al. |
| 2016/0132498 | A1 | 5/2016 | Wang et al. |
| 2018/0129658 | A1 | 5/2018 | Wang et al. |

FOREIGN PATENT DOCUMENTS

| | | |
|---|---|---|
| CN | 102265598 A | 11/2011 |
| CN | 102339306 A | 2/2012 |
| CN | 102902807 A | 1/2013 |

OTHER PUBLICATIONS

"Second Office Action Issued in Chinese Patent Application No. 201380077462.7", dated Feb. 25, 2019, 9 Pages.
"Office Action Issued in European Patent Application No. 13886716.3", dated May 20, 2016, 8 Pages.
"Office Action Issued in European Patent Application No. 13886716.3", dated Jul. 27, 2016, 8 Pages.
"Search Report Issued in European Patent Application No. 13886716.3", dated May 4, 2016, 6 Pages.
Wang, et al., "MindFinder: Image Search by Interactive Sketching and Tagging", In Proceedings of the 19th International Conference on World Wide Web, Apr. 26, 2010, pp. 1309-1312.
"First Office Action and Search Report Issued in Chinese Patent Application No. 201380077462.7", dated May 3, 2018, 13 Pages.
Aishwaryameenakshi, et al., "Image Indexing Using Edgel Index for Sketch-based Image Search and Retrieval", In International Journal of Wisdom Based Computing, vol. 1, Issue 3, Dec. 2011, pp. 134-138.
Borgefors, Gunilla, "Hierarchical Chamfer Matching: A Parametric Edge Matching Algorithm", In IEEE Transactions on Pattern Analysis and Machine Intelligence, vol. 10, Issue 6, Nov. 1988, pp. 849-865.
Bozas, Konstantinos, et al., "Large Scale Sketch Based Image Retrieval Using Patch Hashing", In Proceedings of 8th International Symposium in Visual Computing, Jul. 16, 2012, pp. 210-219.
Cao, et al., "Edgel Index for Large-Scale Sketch-Based Image Search", In Proceedings of IEEE Conference on Computer Vision and Pattern Recognition (CVPR), Jun. 20, 2011, pp. 761-768.
Cao, et al., "Mind Finder: Interactive Sketch-Based Image Search on Millions of Images", In Proceedings of the 18th ACM International Conference on Multimedia, Oct. 25, 2010, pp. 1605-1608.
Chalechale, et al., "Sketch-Based Image Retrieval Using Angular Partitioning", In IEEE Transactions on Systems, Man and Cybernetics, Part A: Systems and Humans, vol. 35, Issue 1, Dec. 14, 2003, 6 Pages.
Cheng, et al., "Global Contrast Based Salient Region Detection", In Proceedings of the IEEE Conference on Computer Vision and Pattern Recognition, Jun. 20, 2011, pp. 409-416.

Collomosse, et al., "Storyboard Sketches for Content Based Video Retrieval", In IEEE 12th International Conference on Computer Vision, Sep. 29, 2009, pp. 245-252.
Bimbo, et al., "Visual Image Retrieval by Elastic Matching of User Sketches", In IEEE Transactions on Pattern Analysis and Machine Intelligence, vol. 19, Issue 2, Feb. 1997, pp. 121-132.
Eitz, et al., "An Evaluation of Descriptors for Large-Scale Image Retrieval from Sketched Feature Lines", In Computers and Graphics, vol. 34, Issue 5, Oct. 2010, 39 Pages.
Eitz, et al., "Learning to Classify Human Object Sketches", In Proceedings of ACM Special Interest Group on Computer Graphics and Interactive Techniques, Aug. 7, 2011, 1 Page.
Eitz, et al., "Sketch-Based Image Retrieval: Benchmark and Bag-of-Features Descriptors", In IEEE Transactions on Visualization and Computer Graphics, vol. 17, Issue 11, Nov. 1, 2011, pp. 1624-1636.
Fonseca, et al., "Sketch-Based Retrieval of Complex Drawings Using Hierarchical Topology and Geometry", In Journal of Computer-Aided Design, vol. 41, Issue 12, Dec. 2009, pp. 1067-1081.
Funkhouser, et al., "A Search Engine for 3D Models", In ACM Transactions on Graphics, vol. 22 Issue 1, Jan. 2003, pp. 83-105.
Giangreco, et al., "A User Interface for Query-by-Sketch Based Image Retrieval with Color Sketches", In Proceedings of the 34th European Conference on Advances in Information Retrieval, Apr. 1, 2012, pp. 571-572.
Hu, et al., "Annotated Free-Hand Sketches for Video Retrieval Using Object Semantics and Motion", In Proceedings of the 18th International Conference on Advances in Multimedia Modeling, Jan. 4, 2012, 12 Pages.
Hua, "Interactive Image Search: Search by Color Sketch Just Released in Microsoft Bing Image Search", Retrieved from <<http://xshua.wordpress.com/2010/06/12/interactive-image-search-search-by-color-sketch-just-released-in-microsoft-bing-image-search/>>, Jun. 12, 2010, 14 Pages.
Jacobs, et al., "Fast Multiresolution Image Querying", In Proceedings of the 22nd Annual Conference on Computer Graphics and Interactive Techniques, Aug. 6, 1995, 10 Pages.
Lei, et al., "A CBIR Method Based on Color-Spatial Feature", In Proceedings of the IEEE Region 10 Conference TENCON, Sep. 15, 1999, 4 Pages.
Lowe, David G., "Object Recognition from Local Scale-Invariant Features", In Proceeding of the 7th International Conference on Computer Vision, vol. 2, Sep. 20, 1999, pp. 1150-1157.
Lu, et al., "Efficient Image Retrieval by Color Contents", In International Conference on Applications of Databases, Jun. 21, 1994, pp. 95-108.
"International Search Report and Written Opinion Issued in PCT Application No. PCT/CN2013/077211", dated Mar. 20, 2014, 10 Pages.
Riesenhuber, et al., "Hierarchical Models of Object Recognition in Cortex", In Journa of Nature Neuroscience, vol. 2, Issue 11, Sep. 23, 1999, 26 Pages.
Sande, et al., "Evaluating Color Descriptors for Object and Scene Recognition", In IEEE Transactions on Pattern Analysis and Machine Intelligence, vol. 32, Issue 9, Sep. 2010, pp. 1582-1596.
Shotton, et al., "Multiscale Categorical Object Recognition Using Contour Fragments", In IEEE, Transactions on Pattern Analysis and Machine Intelligence, vol. 30, Issue 7, Jul. 1, 2008, pp. 1270-1281.
Siagian, et al., "Rapid Biologically-Inspired Scene Classification using Features Shared with Visual Attention", In Proceedings of IEEE Transactions on Pattern Analysis and Machine Intelligence, vol. 29, Issue 2, Feb. 2007, pp. 300-312.
Smith, et al., "VisualSEEk: A Fully Automated Content-Based Image Query System", In Proceedings of the Fourth ACM International Conference on Multimedia, Nov. 20, 1996, 12 Pages.
Stenger, et al., "Model-Based Hand Tracking Using a Hierarchical Bayesian Filter", In IEEE Transactions on Pattern Analysis and Machine Intelligence, vol. 28, Issue 9, Jul. 24, 2006, 14 Pages.
Sun, et al., "Query-Adaptive Shape Topic Mining for Hand-Drawn Sketch Recognition", In Proceedings of the 20th ACM International Conference on Multimedia, Oct. 29, 2012, pp. 519-528.

(56) References Cited

OTHER PUBLICATIONS

Tanaka, et al., "The Role of Color in High-Level Vision", In Proceedings of TRENDS in Cognitive Sciences, vol. 5, Issue 5, May 2001, pp. 211-215.

Tirilly, et al., "A Review of Weighting Schemes for Bag of Visual Words Image Retrieval", Retrieved from: <<https://hal.inria.fr/file/index/docid/380706/filename/PI-1927.pdf>>, May 1, 2009, 47 Pages.

Tsend, et al., "Sketch-Based Image Retrieval on Mobile Devices Using Compact Hash Bits", In Proceedings of the 20th ACM International Conference on Multimedia, Oct. 29, 2012, pp. 913-916.

Wang, et al., "Interactive Image Search by Color Map", In Journal of ACM Transactions on Intelligent Systems and Technology, vol. 2, Issue 3, Oct. 2010, 25 Pages.

COLOR SKETCH IMAGE SEARCHING

This application is a continuation of U.S. application Ser. No.: 14/898,117, filed Dec. 11, 2015; which application is a 371 National Phase of PCT Application No.: PCT/CN2013/077211, filed Jun. 14, 2013, which applications are incorporated herein by reference in their entirety.

BACKGROUND

Searching for images is a common task performed by many computer users. For example, users may search the vast amount of information available via the Internet to find images of particular places or things. While search queries have typically been based solely on keywords, recent technological advances have made other options possible.

Drawing sketches is one of the most natural ways for human beings to communicate with each other, record their thoughts, and express themselves. Touch screen devices, which have become increasingly available and popular, enable users to easily input hand-drawn sketches. Technological advances have also made is possible for users to submit a sketch to be used as the basis for a search for images that are similar to the sketch.

Some sketch-to-image matching techniques primarily consider either shape similarities or color similarities. However, both shape and color convey important information in an image. Accordingly, performing a sketch-to-image match based primarily on shape information may return inferior results due to a lack of consideration of color information. Similarly, a sketch-to-image match based primarily on color information may return inferior results due to a lack of shape information.

SUMMARY

This document describes color sketch image searching. A user interface is provided to enable a user to generate a color sketch and submit the sketch as a search query. Images to be searched and user-submitted sketches are represented as a collection of color-edge words. Each color-edge word includes location information, shape information, and color information. A collection of images to be searched may be indexed, and a matching algorithm determines a similarity score between a sketch and an image based on a combination of location similarity, shape similarity, and color similarity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and, or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
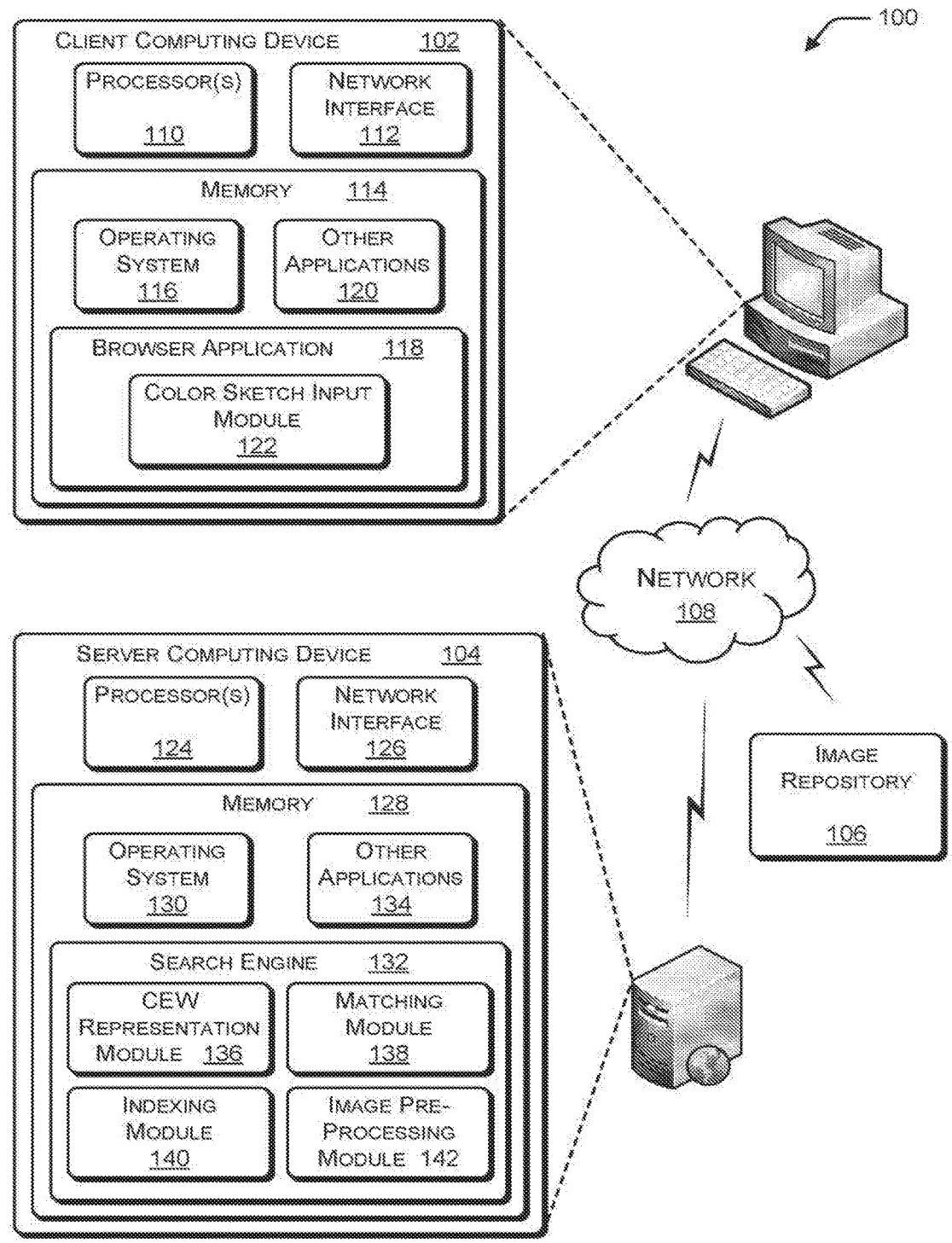
FIG. 1 is a block diagram of an example network environment in which color sketch image searching may be implemented.

Drawing colored sketches as input for an image query is a natural technique for users to convey the search interest. When performing a search based on a user-submitted sketch, it is important to consider both shapes and colors included in the sketch.

Various drawing techniques may be employed to enable a user to create a sketch for an image-based query. For example, a user interface may provide options for a user to create a colored sketch using various drawing tools including, for example, a pen and a color bucket, a pen and a color brush, a color pencil, or a color brush. Various user input devices and/or methods may be used to interact with the user interface to control the drawing tools, including, for example, a mouse, a stylus, a touch screen, gestures, voice activation, and so on. A sketch/image representation is implemented to capture both shape and color information of user-submitted sketches and images to be searched, a sketch-to-image matching technique is used to identify images that are similar to the user-submitted search, and an index structure is used to enable efficient matching of images to a user-submitted sketch.

In an example implementation, an image or a sketch is used to generate a document-like bag-of-words representation based on color-edge words, where each color-edge word (CEW) is composed of a location within the image or sketch, two colors, and a shape that represents a contour fragment that divides the two colors. Based on the color-edge word representation, a modified Chamfer matching algorithm is used to match a color sketch and an image. An inverted index structure is leveraged to speed up the matching process in a large-scale databased. Furthermore, in an example implementation, to improve the likelihood that appropriate images will be matched to user-submitted sketches, each sketch and major objects in each image are rescaled before attempting to match images to a user-submitted sketch.

Example Environment

FIG. 1 illustrates an example network environment 100 in which color sketch image searching may be implemented. The example environment includes a client computing device 102, a server computing devices 104, and an image repository 106, each communicatively coupled to the others via a network 108. Network 108 is representative of, for example, the Internet.

Client computing device 102 is representative of any network-capable computing device, including, but not limited to, a desktop computer system, a laptop computer system, a television system, a gaming system, a mobile smartphone, a tablet computer system, and so on. Example client computing device 102 includes one or more processor(s) 110, a network interface 112, and a memory 114. Network interface 112 enables client computing device 102 to communicate with other devices over the network.

An operating system 116, a browser application 118, and any number of other applications 120 are stored in memory 114 as computer-readable instructions, and are executed, at least in part, by processor 110. Browser application 118 includes a color sketch input module 122 that enables a user to generate a color sketch to be used as the basis for a search query.

Server computing device 104 is representative of any type of computing device implementing a search engine and accessible via network 108. Example server computing device 104 includes one or more processor(s) 124, a network interface 126, and a memory 128. Network interface 126 enables server computing device 104 to communicate with other devices over the network.

An operating system 130, a search engine 132, and any number of other applications 134 are stored in memory 128 as computer-readable instructions, and are executed, at least in part, by processor 124.

Example search engine 132 includes a color-edge word (CEW) representation module 136, a matching module 138, an indexing module 140, and an image pre-processing module 142. Color-edge word representation module 136 analyses an image or a user-generated sketch, generating a color-edge word representation of the image or sketch. Matching module 138 determines, for a user-submitted color sketch, images from image repository 106 that most resemble the sketch. Indexing module 140 generates an inverted index based on the color-edge word representation of the images in image repository 106 to improve the speed with which matching module 138 is able to identity images that most resemble a user-submitted sketch. Image pre-processing module 142 converts each image in image repository 106 to an edge map. The edge map is processed by color-edge word presentation module 136 to generate the color-edge word representation of the image.

Although described herein with reference to a browser application and an Internet search engine, color sketch image matching may be implemented in either search environments. For example, browser application 418 and components of search engine 132 may represent an interface for searching an image repository, which may or may not be accessible via the internet. For example, color sketch image matching may be implemented to enable a user to search for clip art from within a document editing application. Alternatively, color sketch image matching may be implemented to enable a user to search a personal photo repository. Color sketch image matching, as described herein, may be implemented in essentially any environment or scenario in which a user would like to locate an image, where characteristics of the image can be represented in a user-generated color sketch. In various implementations, any combination of color sketch input module 122, CEW representation module 136, matching module 138, indexing module 140, and image repository 106 may be implemented on a single device (e.g., client computing device 102), or may be distributed across multiple computing devices accessible one to another via a network.

Although illustrated in FIG. 1 as being stored in memory 114 of client computing device 102, browser application 118, or portions thereof, may be implemented using any form of computer-readable media that is accessible by client computing device 102. Furthermore, in alternate implementations, one or more components of operating system 116, browser application 118, and other applications 120 may be implemented as part of an integrated circuit that is part of, or accessible to, client computing device 102.

Similarly, search engine 132, or portions thereof, may be implemented using any form of computer-readable media that is accessible by server computing device 104. Furthermore, in alternate implementations, one or more components of operating system 130, search engine 132, and other applications 134 may be implemented as part of an integrated circuit that is part of, or accessible to, server computing device 104.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other mechanism. As defined herein, computer storage media does not include communication media.

Color-Edge Word Representation

While existing well-known local feature techniques for natural image analysis, such as SIFT (scale-invariant feature transform), may be effectively leveraged for professional drawings or images, hand drawn sketches are typically more simple and abstract, often lacking detailed textures, which are the basic elements in most local features. Furthermore, most global feature techniques, such as GIST and ColorHistogram, only capture global statistics from an image and do not encode detailed shape structures.

Accurate matching of hand-drawn color sketches to a database of available images is most likely achieved using an algorithm that compares images, as much as possible, in the same way the human brain compares images. Studies in cognitive science have led to some conclusions regarding how humans perceive shape and color within an image. In particular, two observations regarding visual perception of shape and color have been considered in developing the color-edge word representation described herein. First, human perception of shape and color are sophisticatedly interrelated in the process of object recognition. Second, color information is mostly obtained and measured in contour and corner areas of an image, rather than at equally sampled locations across an entire image. Accordingly, the color-edge word representation described herein considers color information in contour and corner areas combined with local shape information.

In addition to encoding both color and shape information, the color-edge word representation enables both reproduction and indexing of the sketch/image being represented. Each sketch/image is represented by a bag of features with coordinates such that, for each small contour fragment, the contour fragment and colors on each side of the contour fragment are encoded into a single visual word, referred to herein as a color-edge word.

Figure 2:
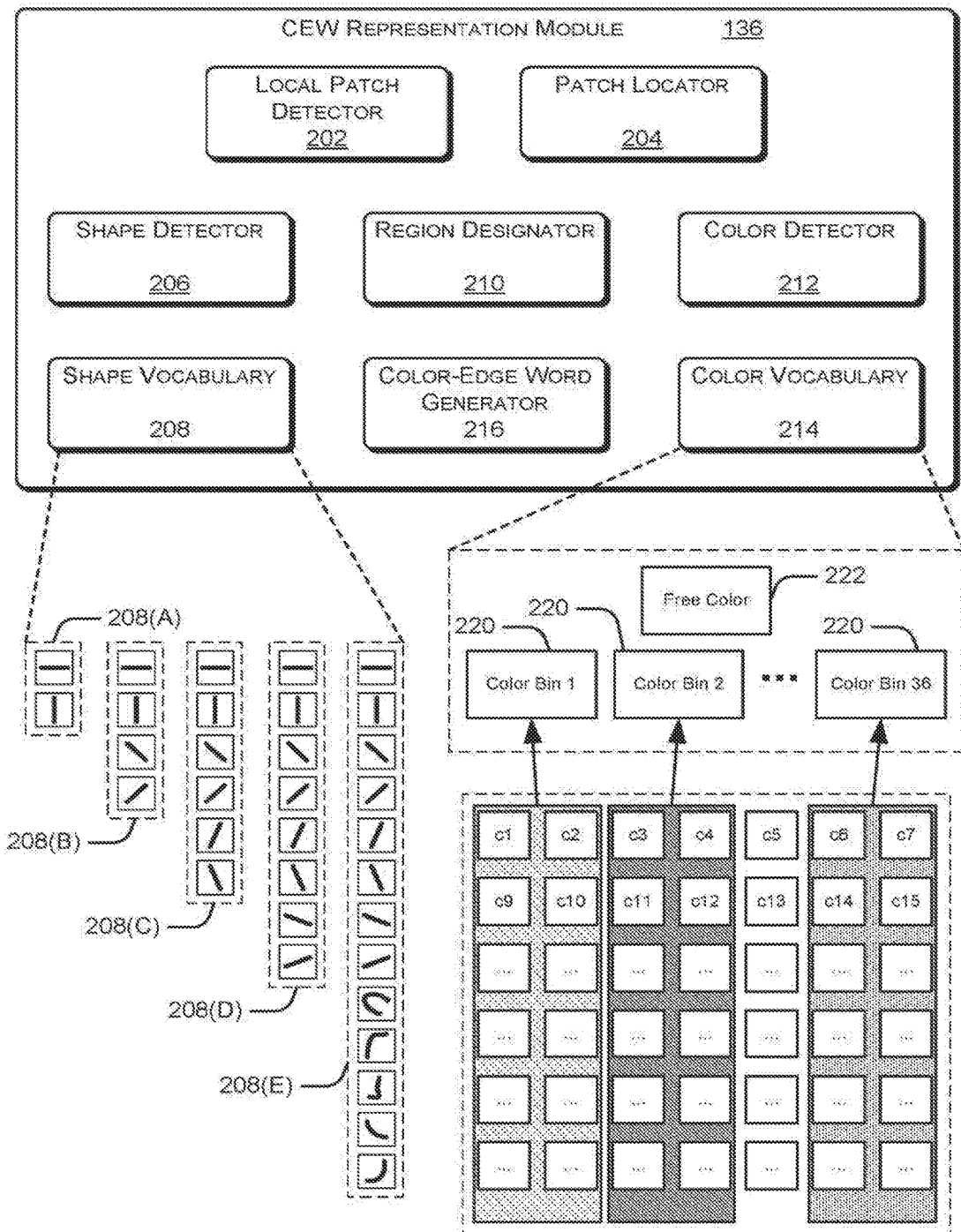
FIG. 2 is a block diagram of select components of an example color-edge word representation module as shown in FIG. 1.

FIG. 2 illustrates select components of an example CEW representation module 136. In an example implementation, CEW representation module 136 includes a local patch detector 202, a patch locator 204, a shape detector 206, a shape vocabulary 208, a region designator 210, a color detector 212, a color vocabulary 214, and a color-edge word generator 216.

Local patch detector 202 extracts local patches along the contours of a sketch or image.

Patch locator 204 determines a location of the patch within the image or sketch. In an example implementation, the location is represented by (x, y) coordinates.

Shape detector 206 analyzes a contour fragment of a patch, comparing the contour fragment to shapes found in the shape vocabulary 208. Shape detector 206, selects from shape vocabulary 208, the shape that most closely resembles the contour fragment of the patch.

Shape vocabulary 208 includes a plurality of shapes that are at least similar to image contour fragments. In an example implementation, shape vocabulary 208 is built based on patches identified in a sample set of images. For example, images from image repository 106 may be used to build the shape vocabulary 208. In an example implementation, 100,000 patches are randomly sampled from the images. A k-medoids clustering algorithm is then leveraged to group the contour fragments from the patches. The distance between two contour fragments may be measured using, for example, the basic Chamfer distance. Each cluster is then used to define a shape in the shape vocabulary 208.

As illustrated in FIG. 2, shape vocabulary 208 may be built based on any number of contour fragment clusters. For example, shape vocabulary 208(A) is based on only two clusters. In this example, the 100,000 sampled patches are separated into only two clusters. The result is a vocabulary that contains only a horizontal shape and a vertical shape. This is a very simplistic, and likely not very useful, shape vocabulary.

Shape vocabularies 208(B), 208(C), 208(D), and 208(E) are examples of increasingly more complex shape vocabularies built using an increasing number of clusters. In the illustrated example, each shape in shape vocabularies 208 (A), 208(B), 208(C), and 208(D) is a straight line segment. In contrast, in a more complex shape vocabulary 208(E), as a larger number of clusters are used to build the shape vocabulary, more complex shapes, including curves and/or sharp turns, are included in the shape vocabulary.

The size of the shape vocabulary directly affects a degree which shape is considered when performing color sketch image searching. That is, if the shape vocabulary 208 is relatively small (e.g., shape vocabulary 208(A)), the shape associated with each identified patch within an image may be only a very rough estimate of the actual contour fragment of the patch. In contrast, if the shape vocabulary is relatively large (e.g., shape vocabulary 208(E)), the shape associated with each identified patch within an image is likely to be a more accurate estimate of the actual contour fragment. The more accurate the representation of the contour fragment in each patch, the more closely shapes within an image returned as a search result will match shapes within a user-generated sketch that is used as the basis for the search.

Region designator 210 designated one region of the patch as a "right region" and designates the other region of the patch as a "left region." In an example implementation, region designator 210 designates the region based on a comparison of the patch to a seed patch that is based on the shape selected from shape vocabulary 208.

Color detector 212 determines a dominant color of each region of the patch. For example, the dominant color of each region may be extracted and quantized in a particular color space. In an example implementation the HSV (hue saturation value) color space 218 is quantized to a predetermined number of bins according to human color perception. In one example, color vocabulary 214 defines 36 bins 220. The HSV color space 218 is quantized into the 36 bins, with coarser quantization in low value/saturation areas and finer quantization in high value/saturation areas. In alternate implementations, color vocabulary may include a different number of color bins and/or may be based on a different color space.

To ensure that user-generated sketches, which may include areas of no color, are able to be matched to various images, a "free color" (or "wildcard color") 222 is defined to describe the color of region that is not painted with any color. The distance between any color and the free color 222 is defined as zero. As such, any color can match the free color.

Color-edge word generator 216 generates a color-edge word that represents the patch. In an example implementation, the color-edge word is represented as a quintuple based on the patch location, the determined shape, and the determined dominant colors.

Figure 3:
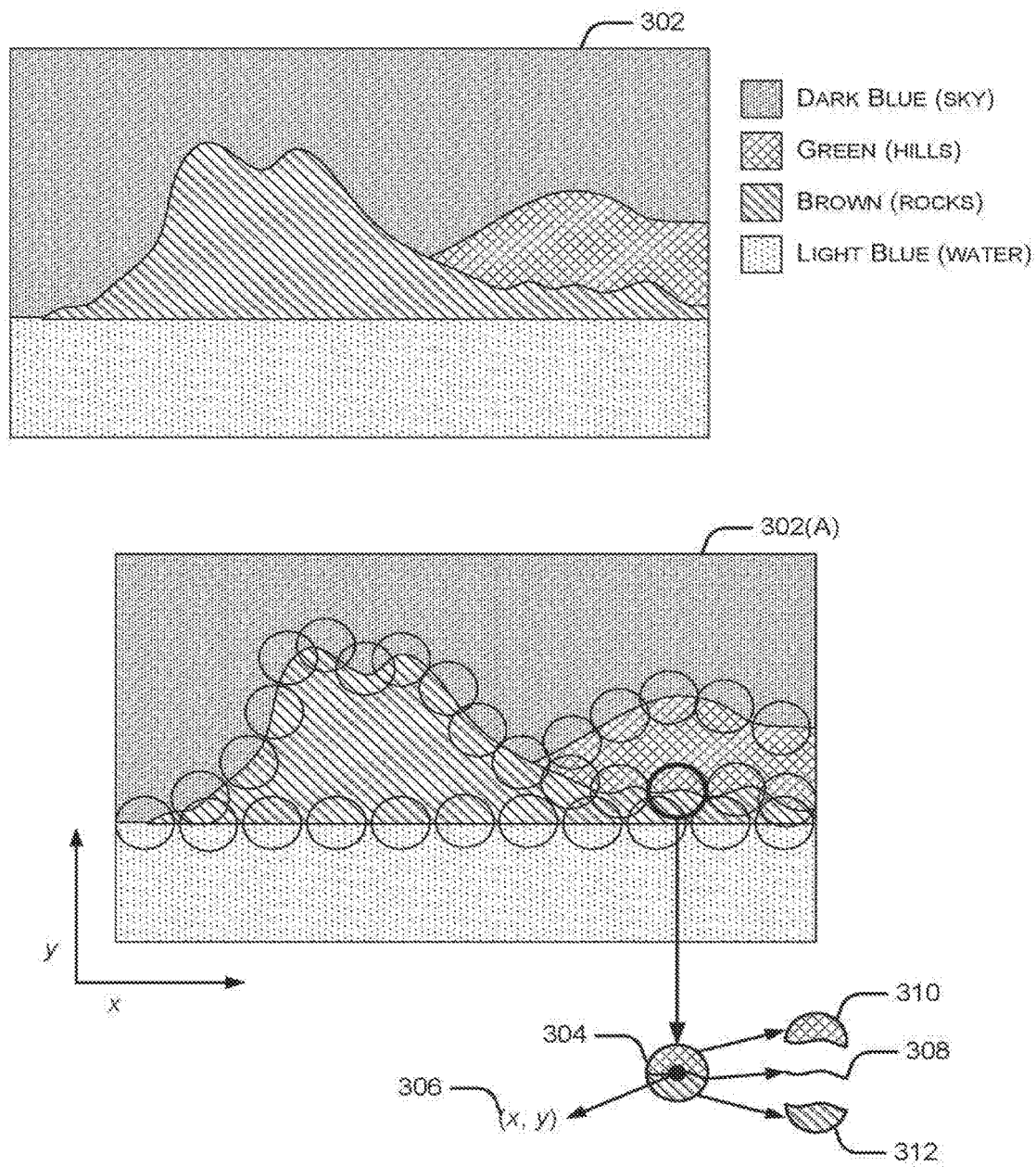
FIG. 3 is a pictorial diagram illustrating local patch detection.

FIG. 3 illustrates an example of local patch detection and location, as performed by local patch detector 202 and patch locator 204. Example image 302 includes various colors, as indicated by the key to the right of the image. Local patches are then identified within the image, as illustrated in image 302(A).

In an example implementation, local patch detector 202 extracts salient contours using a Canny edge detector, and removes short trivial lines. For a single continuous contour, local patch detector 202 slides a patch detection window of size R×R along the contour to identify patches that each contain a contour fragment and two neighboring local regions. In an example implementation, identified patches may overlap to ensure that the contour fragment in each patch is long enough to separate the patch into two regions without ambiguity.

In complex areas of an image or sketch, a particular patch may include multiple contour fragments. To ensure that each patch has only one shape and two regions, a patch is defined as having a contour fragment that intersects the center of the patch and the ends of the contour fragment meet the boundary of the patch.

In complex areas that include multiple contours that are close to each other or intersecting, multiple overlapping patches may be identified so that each patch has one associated contour fragment (i.e., the fragment that intersects the center of the patch), and two distinct regions.

Various components of each patch are then considered in generating a color-edge word for the patch. For example, patch locator 204 determines a particular location in image 302(A) that corresponds to patch 304. This location may be designated by (x, y) coordinates 306. Furthermore, patch 304 includes three distinct components, namely, contour fragment 308, a first region 310, and a second region 312.

Figure 4:
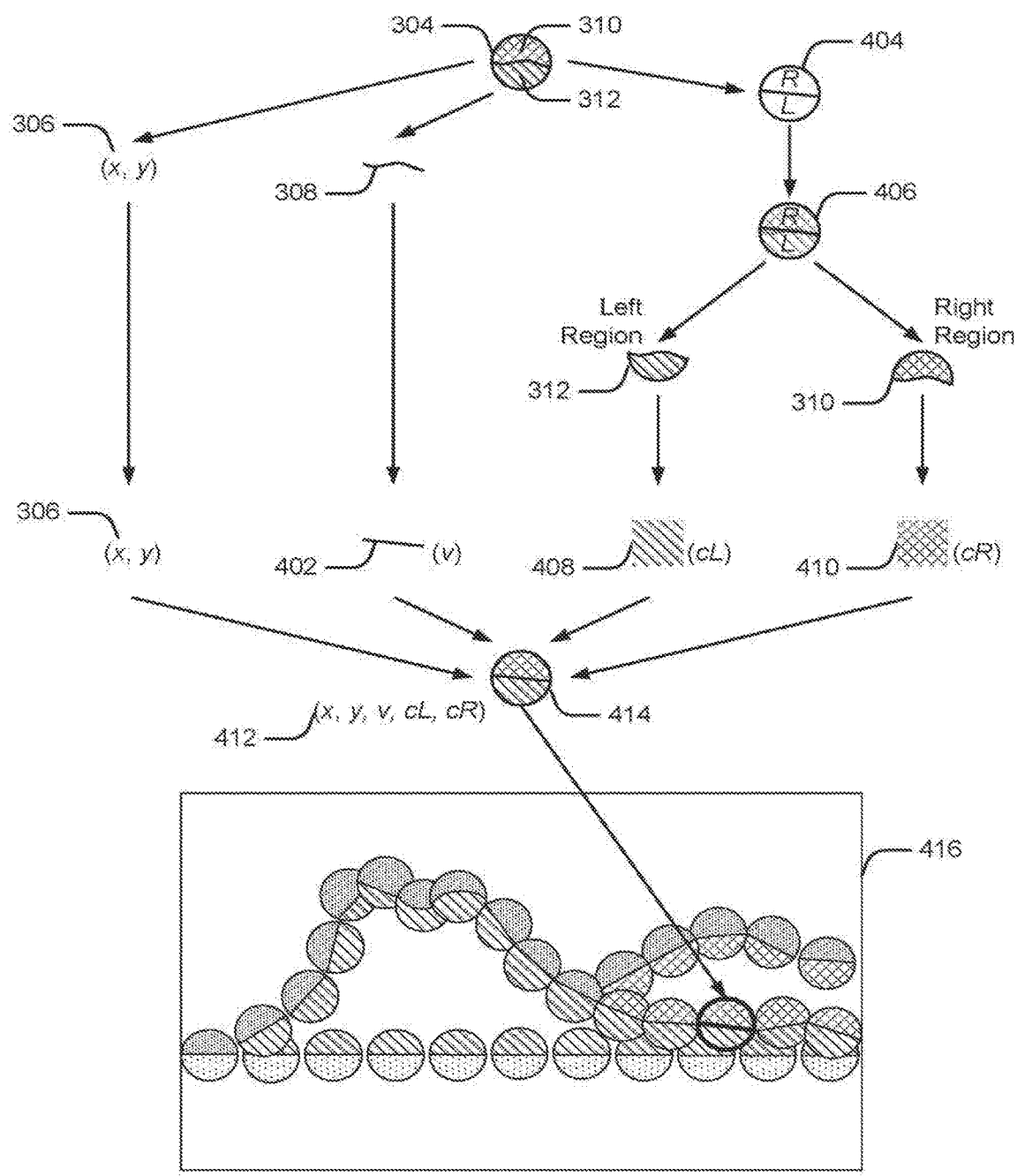
FIG. 4 is a pictorial diagram illustrating an example color-edge word representation of an image.

FIG. 4 illustrates an example of identifying a shape associated with a patch as performed by patch locator 204, designating right and left regions of the patch as performed by region designator 210, identifying dominant colors of the regions in a patch as performed by color detector 212, generating a color-edge word for a patch as performed by color-edge word generator 216, and representing an image or sketch as a bag of color-edge words.

As described above with reference to FIG. 3, patch 304 includes contour fragment 308. In an example implementation, shape detector 206 compares contour fragment 308 to the various shapes in shape vocabulary 208. The shape in the shape vocabulary that most closely resembles contour fragment 308 is selected to represent contour fragment 308. In the illustrated example, shape 402, designated as (v), is selected to represent contour fragment 308.

Region designator 210 designates a left region and a right region for each patch. In an example implementation, each shape in shape vocabulary 208 has a corresponding seed patch. The seed patch is the same size as the patches identified in the image, and includes the shape placed through the middle of the seed patch. The two regions of the seed patch are pre-defined as a left region and a right region.

In the illustrated example, seed patch 404 corresponds to shape 402 and has a predefined left region and a predefined right region. To determine, for regions 310 and 312, which is the left region and which is the right region, a comparison between patch 304 and seed patch 404 is performed, as illustrated at 406. Because the portion of region 310 that overlaps the right region of seed patch 404 is greater than the portion of region 312 that overlaps the right region of seed patch 404, region 310 is designated as the right region of patch 304. Similarly, because the portion of region 312 that overlaps the left region of seed patch 404 is greater than the portion of region 312 that overlaps the left region of seed patch 404, region 312 is designated as the left region of patch 304.

Color detector 212 identifies the dominant color of each region in each patch. In the illustrated example, region 310 is green in color and region 312 is brown in color. In an example scenario, region 310 may actually include various shades of green. Similarly, region 312 may include various shades of brown. Furthermore, region 310 may include small amounts of one or more colors other than green, and similarly, region 312 may include small amounts of one or more colors other than brown.

As described above, the dominant color of each region may be determined based on bins in an HSV color space, where the bins correspond to colors that can be perceived by humans. These bins make up color vocabulary 214. In the illustrated example, left region 312 is determined to have a dominant color 408, designated as cL. Similarly, right region 310 is determined to have a dominant color 410, designated as cR.

Color-edge word generator 216 then generates a color-edge word for each patch. In the illustrated example, quintuple 412 is a color-edge word generated from the (x, y) coordinates 306, the shape (v) 402, the dominant color of the left region (cL) 408, and the dominant color of the right region (cR) 410. The color-edge word is denoted by (x, y, v, cL, cR).

The color-edge word may also be represented visually by a patch 414 that includes the shape (v) 402, with the right region having color (cR) 410 and the left region having color (cL) 408. The location component of the color-edge word (x, y) denotes the location within the image of the patch represented by the color-edge word.

The sketch or image is then represented as a bag of color-edge words. For example, as illustrated in FIG. 4, representative image 416 is a compilation of color-edge words generated from image or sketch 302.

Color Sketch to Image Matching

The goal of color sketch image searching, as described herein, is to receive a user-generated color sketch and identify similar images in a database (or other data repository, e.g., the Internet). Let Q denote a set of color-edge words that represents a color sketch, in which a color-edge word $q \in Q$ is a quintuple $(x_q, y_q, v_q, cL_q, cR_q)$ having position $x_q=(x_q, y_q)$, edge word $v_q$, and color words $c_q=(cL_q, cR_q)$. Similarly, let D represent a databased image. To determine whether or not D is a good match for Q, an algorithm is used to compute the distance (or similarity) between Q and D, denoted by $Dist_{Q,D}$ (or $Sim_{Q,D}$).

Chamfer matching is an effective tool in matching sketches to images based on shape. By definition, the basic Chamfer distance from a database image D to a sketch Q is defined as:

$$Dist_{D \to Q} = \frac{1}{|D|} \sum_{p \in D} \min_{q \in Q} \|x_p - x_q\|_2 \qquad (1)$$

where |D| is the number of edge pixels (edgels) of image D and $x_p$ and $x_q$ are two edgel's positions. Chamfer matching seeks to find the nearest edgel on the query sketch Q for every edgel of the databased image D. In practice, to reduce the complexity from $O(|D| \times |Q|)$ to $O(|D|)$, a distance transform map of the query sketch Q may be constructed in advance. This technique reduces time cost by increasing storage cost. The symmetric Chamfer distance is given by;

$$Dist_{D,Q} = \frac{1}{2}(Dist_{Q \to D} + Dist_{D \to Q}) \qquad (2)$$

While Chamfer matching, and variants thereof, has seen success in shape matching, Chamfer matching is designed for raw curve matching, and cannot be directly used to match color-edge words. However, with some modification, a new algorithm based on Chamfer matching is developed for application to sketches and images represented by sets of color-edge words.

The Chamfer matching algorithm described above is modified such that the basic element is any visual word associated with coordinates, rather than a single pixel. Furthermore, rather than calculating the geometric distance between two pixels as represented in Eq. 1, the modified Chamfer algorithm calculates the distance between two visual words according to:

$$Dist_{D \to Q} = \frac{1}{|D|} \sum_{p \in D} \min_{q \in Q} dist(p, q) \qquad (3)$$

where Q and D are sets of any visual words and dist(·,·) is a feature distance measurement. The symmetric modified Chamfer distance is the same as Eq. 2.

To apply the modified Chamfer algorithm described above to the color-edge word sketch image representation described herein, the distance function is changed to a similarity function to ease implementation of indexing. Generalized one-way similarity is defined as:

$$Sim_{D \to Q} = \frac{1}{|D|} \sum_{p \in D} \max_{q \in Q} sim(p, q) \quad (4)$$

and the generalized symmetric Chamfer similarity is defined as:

$$Sim_{Q,D} = (Sim_{Q \to D} \cdot Sim_{D \to Q})^{\frac{1}{2}} \quad (5)$$

As defined herein, sim(p, q) is determined by three factors: first, the geometric distance between p and q, i.e., $sim^{xy}(p, q)$; second, the shape similarity $sim^v(p, q)$; and third, the color similarity $sim^c(p, q)$. The overall similarity is thus defined as:

$$sim(p, q) = sim^{xy}(p, q) \cdot sim^v(p, q) \cdot sim^c(p, q) \quad (6)$$

where:

$$sim^{xy}(p, q) = \delta(\|x_p - x_q\|_2 \leq r) \quad (7)$$

$$sim^v(p, q) = \delta(v_p == v_q) \quad (8)$$

$$sim^c(p, q) = \left(s((cL)_p, (cL)_q) \cdot s((cR)_p, (cR)_q)\right)^{\frac{1}{2}} \quad (9)$$

To support indexing, as will be discussed in further detail below, both $sim^{xy}(x_p, x_q)$ and $sim^v(v_p, v_q)$ take binary forms, with $\delta(\cdot)$ being 1 if the argument expression is true and 0 otherwise, and r is a parameter to binarize the distance (similarity) between two color-edge words. If the distance is smaller than r, the two local contour fragments (i.e., shapes) meet a shape similarity threshold. If the distance is not smaller than r, then the two local contour fragments do not meet the shape similarity threshold in an example implementation, $\delta(\cdot)$ is a Dirac Delta function, which is used to provide fast index recall. In an example implementation, continuous distance functions may be used to provide further re-ranking.

In the equations above, $s(c_1, c_2)$ is a color similarity function that is defined based on two quantized color words from the same side. That is $c_1$ and $c_2$ are the dominant colors for the left region of two image patches or $c_1$ and $c_2$ are the dominant colors for the right region of two image patches.

In an example implementation referred to herein as a "strong-match" implementation, $s(c_1, c_2) = \delta(c_1 == c_2)$. In an alternate implementation, referred to herein as a "flexible-match" implementation, $s(c_1, c_2) = \max\{\delta(c_1 == c_2), \alpha\}$, in which $0 < \alpha < 1$. The strong-match implementation rigidly enforces color matching between a sketch and an image. In contrast, the flexible-match implementation provides flexibility via the parameter $\alpha$, which is used to adjust preferences between color and shape. The larger the value of $\alpha$, the more the search results will emphasize shape similarity. In other words, if $\alpha$ is a small value, the top search results will include images with good shape matching and good color matching, as the value of $\alpha$ increases, search result images with good shape matching, but worse color matching will be ranked higher. The strong match implementation is equivalent to the flexible match implementation when $\alpha=0$.

Color-Edge Word Indexing

Although Chamfer matching is a relatively straightforward process, it is still difficult to develop a real-time system based on linear scanning of millions of images. However, by using an inverted index, the matching algorithm described herein is scalable to large-scale databases.

Referring first to the strong-match implementation described above, Eq. 4 defines a generalized one-way similarity. As described above, each similarity in Eq. 6 is binary. Thus, the "max" operation in Eq. 4 is also binary. Accordingly, Eq. 4 can be rewritten as:

$$Sim_{D \to Q} = \frac{1}{|D|} \sum_{p \in D} Hit_Q(P) \quad (10)$$

where $Hit_Q(P)$ is 1 if there exists q∈Q satisfying Eqs. 7-9, and $Hit_Q(P)$ is 0 otherwise. In other words, for a color-edge word p in a database image, a determination is made as to whether or not there is a similar color-edge word (i.e., a color-edge word with the same shape and the same colors) around the position $x_p$ in the query sketch. In an example implementation, this determination is achieved using query dilation and quintuple inverted index lookups.

To build an inverted index to support the Chamfer matching described herein, a dictionary is constructed to include each color-edge word p=(x, y, v, cL, cR) as a word in the dictionary. The color-edge word dictionary size is img_width×img_height×|V|×|C|², in which |V| and |C| are the sizes of shape vocabulary 208 and color vocabulary 214.

Figure 5:
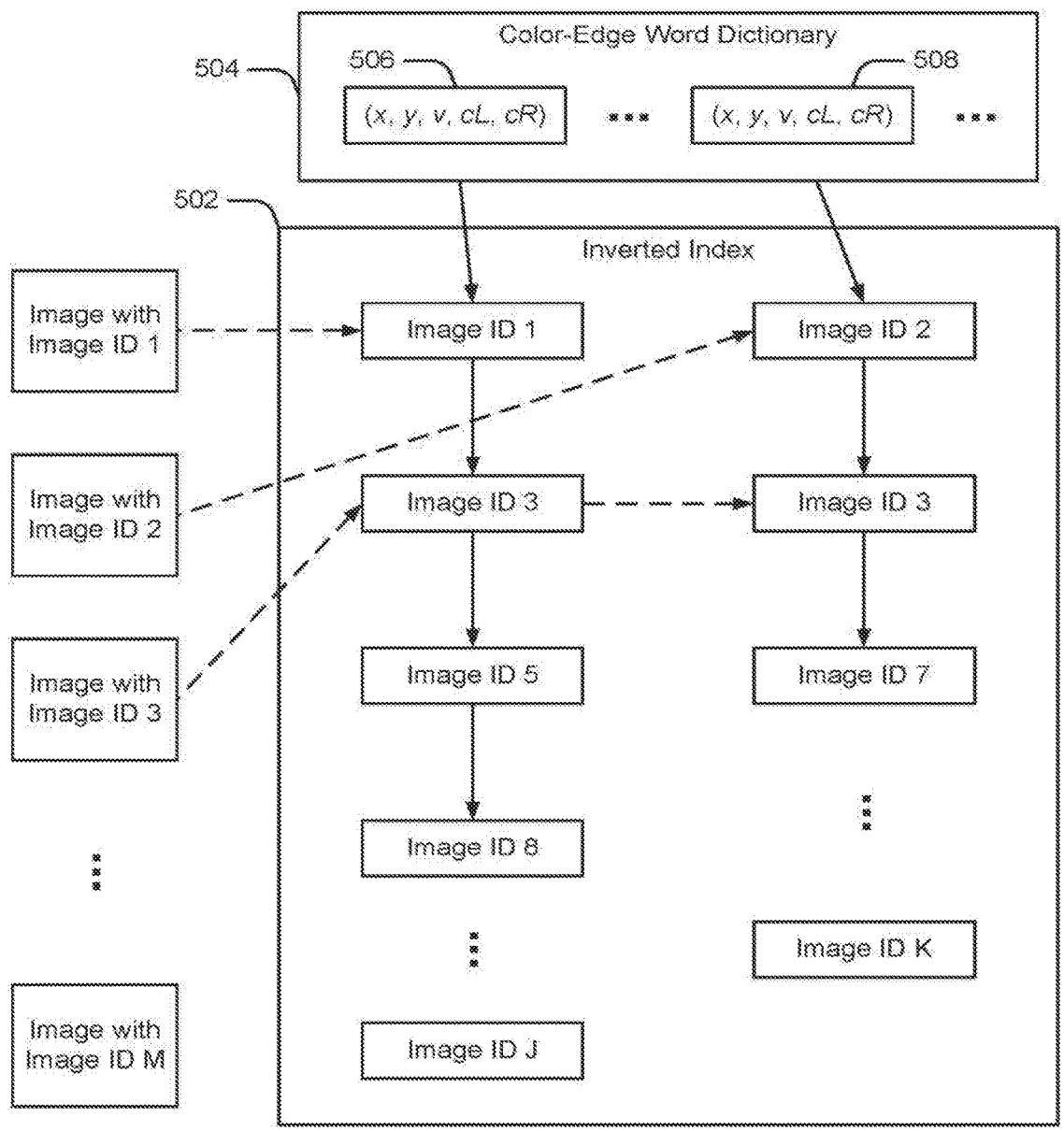
FIG. 5 is a block diagram of an example inverted index for a strong-match implementation of color sketch image searching.

FIG. 5 illustrates an example inverted index 502 for a strong-match implementation. As described above, an inverted list is built for each color-edge word in the dictionary 504. For a particular color-edge word, if an image in the database includes the color-edge word, then an image ID associated with the image is added to the inverted list for that color-edge word. For example color-edge word 506 has an inverted list that includes image ID 1, image ID 3, image ID 5, image ID 8, . . . and image ID J, indicating that images 1, 3, 5, 8, . . . , and J each include a patch corresponding to color-edge word 506. Similarly, color-edge word 508 has an inverted list that includes image ID 2, image ID 3, image ID 7, . . . , and image ID K.

Figure 6:
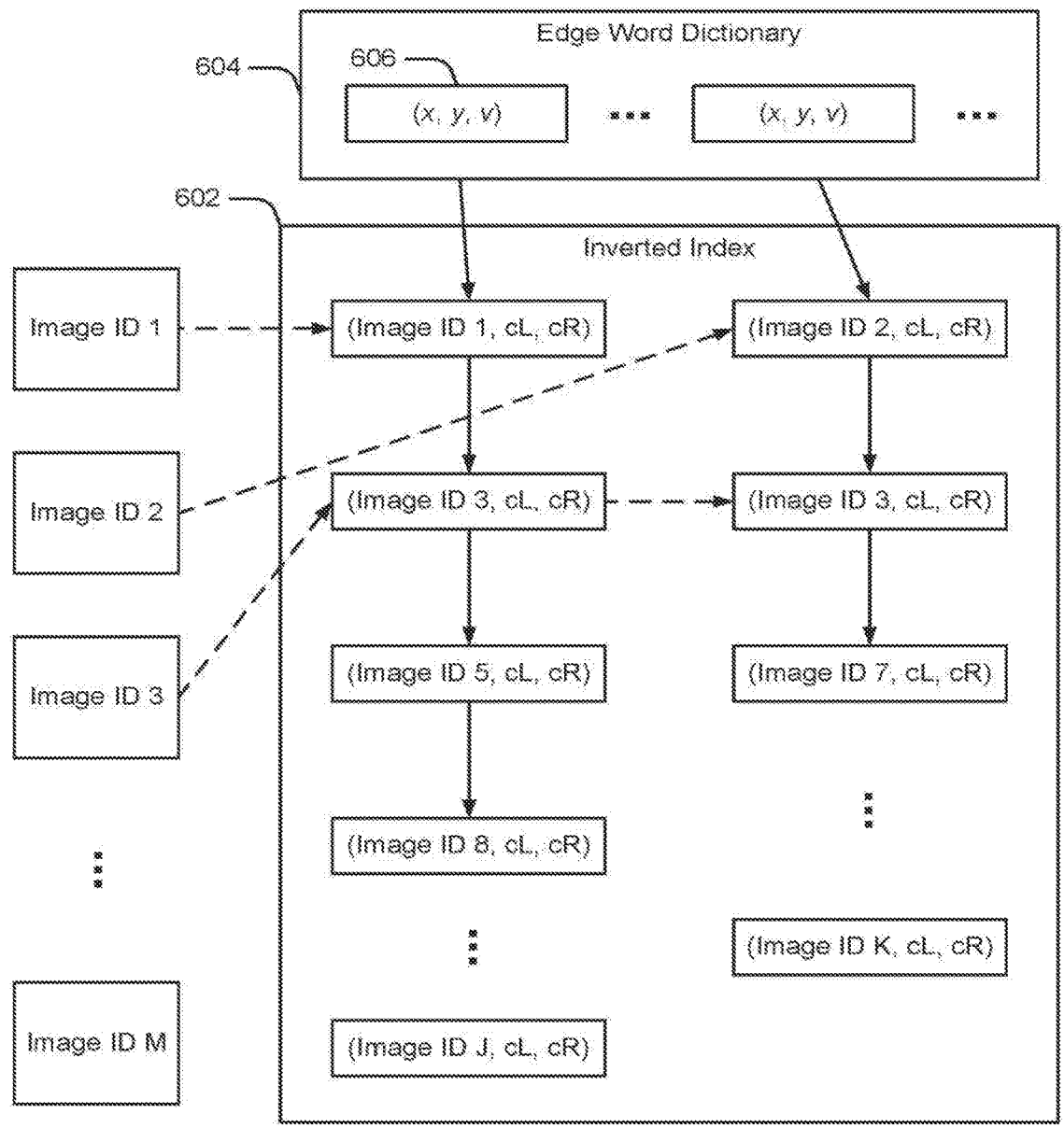
FIG. 6 is a block diagram of an example inverted index for a flexible-match implementation of color sketch image searching.

FIG. 6 illustrates an example inverted index 602 for a flexible-match implementation. As described above, in the flexible-match implementation, similarity between color words is not binary. To capture the flexibility provided by the flexible-match implementation for matching colors, edge word dictionary 604 includes triplets (x, y, v) 606 as words, where each triplet corresponds to one or more color-edge words and includes only the location (x, y) and shape (v) information.

Similar to inverted index 502, described above, inverted index 602 includes an inverted list built for each edge word in the dictionary 604. For a particular edge word in the dictionary 604, if an image in the database includes a color-edge word with the same location and shape information, then the image ID associated with the image is added to the inverted list for the edge word. In contrast to inverted index 502, because dictionary 604 only includes location and shape information, each entry in the inverted list includes color information in addition to the image ID. That is, for a color-edge word in a database image having location and shape information that matches an edge-word in dictionary 604, the image ID of the image and the color information from the color-edge word are stored together in the inverted index.

Optional Image Pre-Processing

Images to be searched using a query sketch may vary greatly in both size and resolution. In an example implementation, to balance structure information preservation and storage cost, prior to building the index, each database image is down-sampled to a maximum dimension (e.g., 200 pixels). A canny edge detector is then used to extract major object contours of the image. A saliency detector may then be used to extract the major foreground objects, which provide certain scale and translation invariance during matching. The extracted binary saliency map is dilated (e.g., empirically 5 pixels) and used as a mask to remove background edges. The remaining edges are isotropically rescaled and positioned in the center to provide a scale and translation in variance for object retrieval throughout the database. With these pre-processing techniques, a natural image is converted to an edge map, based on which the color-edge word features are extracted to build the inverted index.

Color Propagation and Query Dilation

Figure 7:
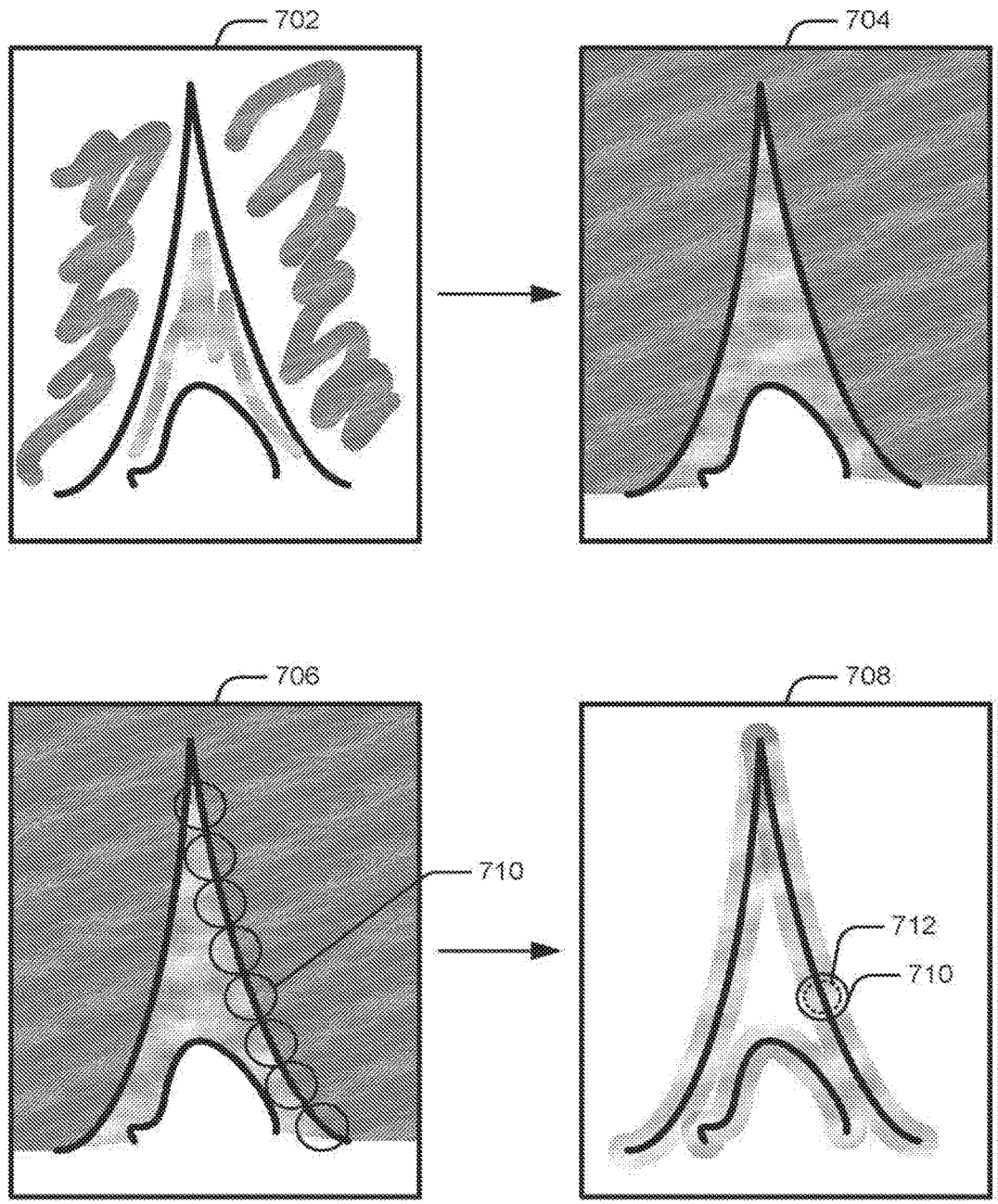
FIG. 7 is a pictorial diagram illustrating example color propagation and query dilation.
Figure 8:
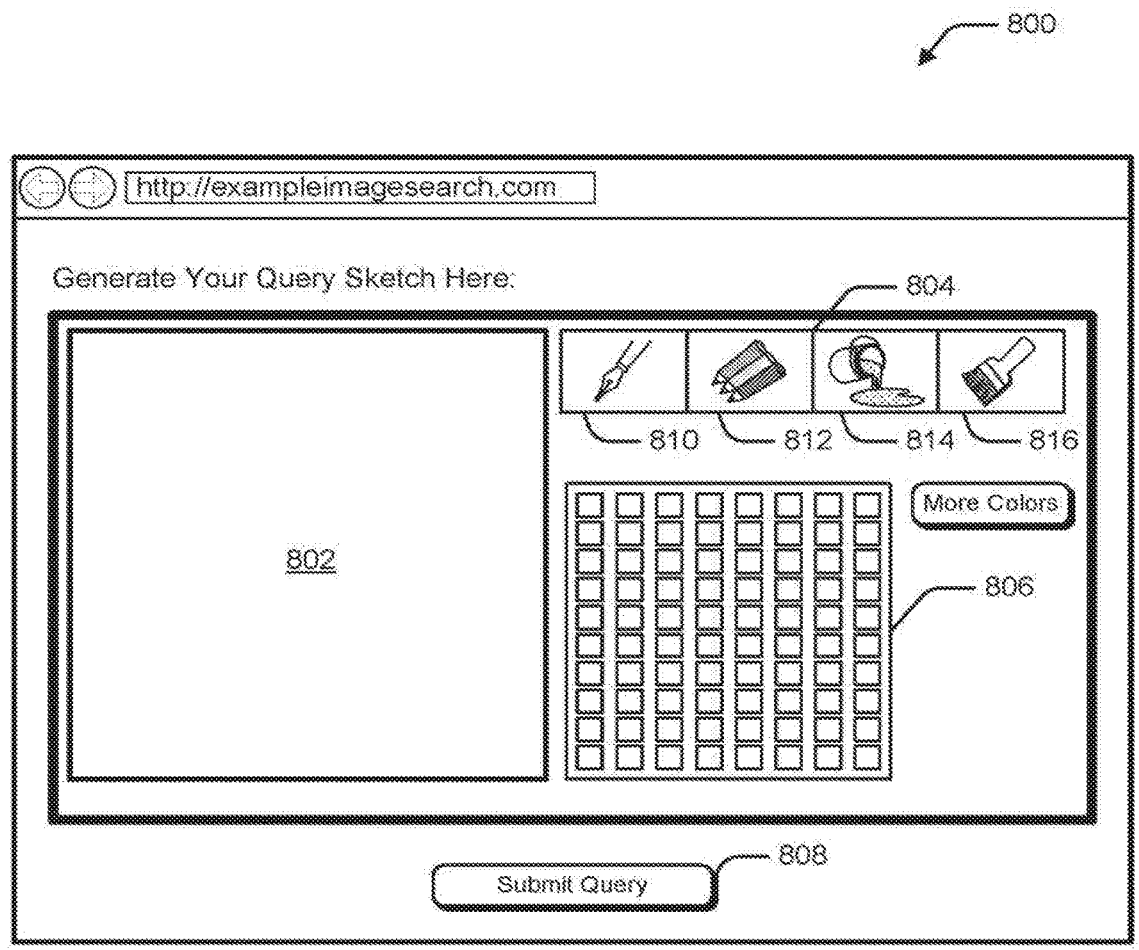
FIG. 8 is a pictorial diagram of an example user interface for generating query sketches.

FIG. 7 illustrates example color propagation and query dilation. When a user-submitted query sketch is received, color propagation and query dilation are performed. In an example implementation, areas of the sketch that are only partially colored may be filled in with the color to ensure an accurate color-edge word representation. Furthermore, to ensure some flexibility in shape locations, each color-edge word in the query sketch is propagated to its neighbors within the distance of r, as defined above with reference to Eq. 7.

In the illustrated example, a user-submitted sketch 702 is received. Color propagation is performed to extend colored areas up to contours within the sketch. For example, in the illustrated sketch 702, the area "behind" the triangular shape is mostly colored. Through color propagation, the entire area "behind" the triangular shape is colored in. Similarly, in the illustrated sketch 702, the area with the triangular shape is mostly colored. Through color propagation, the entire area within the triangular shape is colored in. The result of color propagation is illustrated in sketch 704.

Sketch 706 illustrates select patches that have been identified within the color-propagated sketch 704. Sketch 708 illustrates query dilation. Query dilation is performed to provide some degree of flexibility in matching locations within the sketch to locations within an image. This is consistent with Eq. 7 shown above. In the illustrated example, patch 710 has location coordinates (x, y). Dashed circle 712 has a radius r, and defines an area for which the color-edge word representing patch 710 is to be associated. In other words, the values of v, cL, and cR for the color-edge word associated with patch 710 will also be associated with each other location within dashed circle 712. Accordingly, a color-edge word having the same values of v, cL and cR will be generated for each location having coordinates ranging from (x−r, y−r) to x+r, y+r). The larger the value of r, the greater flexibility exists when matching locations between a sketch and an image.

Match Scoring

According to the described strong-match implementation, when a user-submitted query sketch is received, as described above, a set of color-edge words representing the query sketch is generated. To identify image search results that match the query sketch, inverted index 502 is accessed to identify each image that has at least one color-edge word that matches a color-edge word of the query-sketch. A tally is kept for each image that is identified as a match, such that, an image with a higher tally counts has more color-edge words that match color-edge words of the query sketch than an image with a lower tally count. A one-way match score is then calculated for each database image according to Eq. 10. For example, if a particular database image D has 100 color-edge words, and 25 of those color-edge words match color-edge words of a query sketch Q, then the similarity $Sim_{D \to Q}=0.25$.

Similarly, according to the described flexible-match implementation, when a user-submitted query sketch is received, as described above, a set of color-edge words representing the query sketch is generated. To identity image search results that match the query sketch, inverted index 602 is accessed to identify each image that has at least one edge word (x, y, v) that matches the location and shape information in a color-edge word of the query sketch. Rather than keeping a tally for each image that is identified as a match, each time a match is identified, the color similarity is evaluated according to Eq. 9, and for each image that is identified as a match, a sum of the evaluated color similarity values maintained. A one-way match score is then calculated for each database image according to Eq. 4.

As described above, inverted indexes 502 and 602 are one-way indexes. In an example implementation, another index structure may be built to calculate $Sim_{Q \to D}$, and Eq. 5 could then be used to calculate a final match score for each image. However, to build such an index, image dilation should be performed for each color-edge word in each database image, which would significantly increase storage cost.

Accordingly, in an alternate implementation, using $Sim_{D \to Q}$, a threshold number of candidate images (e.g., the top 5,000) is recalled. These candidate images are linearly scanned to calculate final matching scores for each of these images using Eq. 5. In an example implementation, the query results are ranked for display according to the final matching scores. In some implementations, further re-ranking may be performed using continuous distance functions.

Example User Interface

FIG. 5 illustrates an example user interface 800 for submitting a color sketch as a query. In the illustrated example, color sketch image searching is implemented as part of a search engine. Accordingly, the user interface 800 is depicted as a browser interface. However, as discussed above, color sketch image searching may also be implemented in a variety of other environments. As such, components of user interface 800, as described herein, may be implemented as components of other application user interfaces, such as a photo library application, a clip-art search component of a document generation application, and so on.

Example user interface 800 includes a drawing canvas 802, painting tools 804, a color picker 806, and a query submission button 808. Painting tools 804 may include, for example, binary pen 810, color pencil 812, color bucket 814, and color brush 816.

By selecting colors and tools, a user creates a sketch within drawing canvas 802. When satisfied with the sketch, the user selects the query submission button 808 to send the sketch as a query to the search engine.

Figure 9:
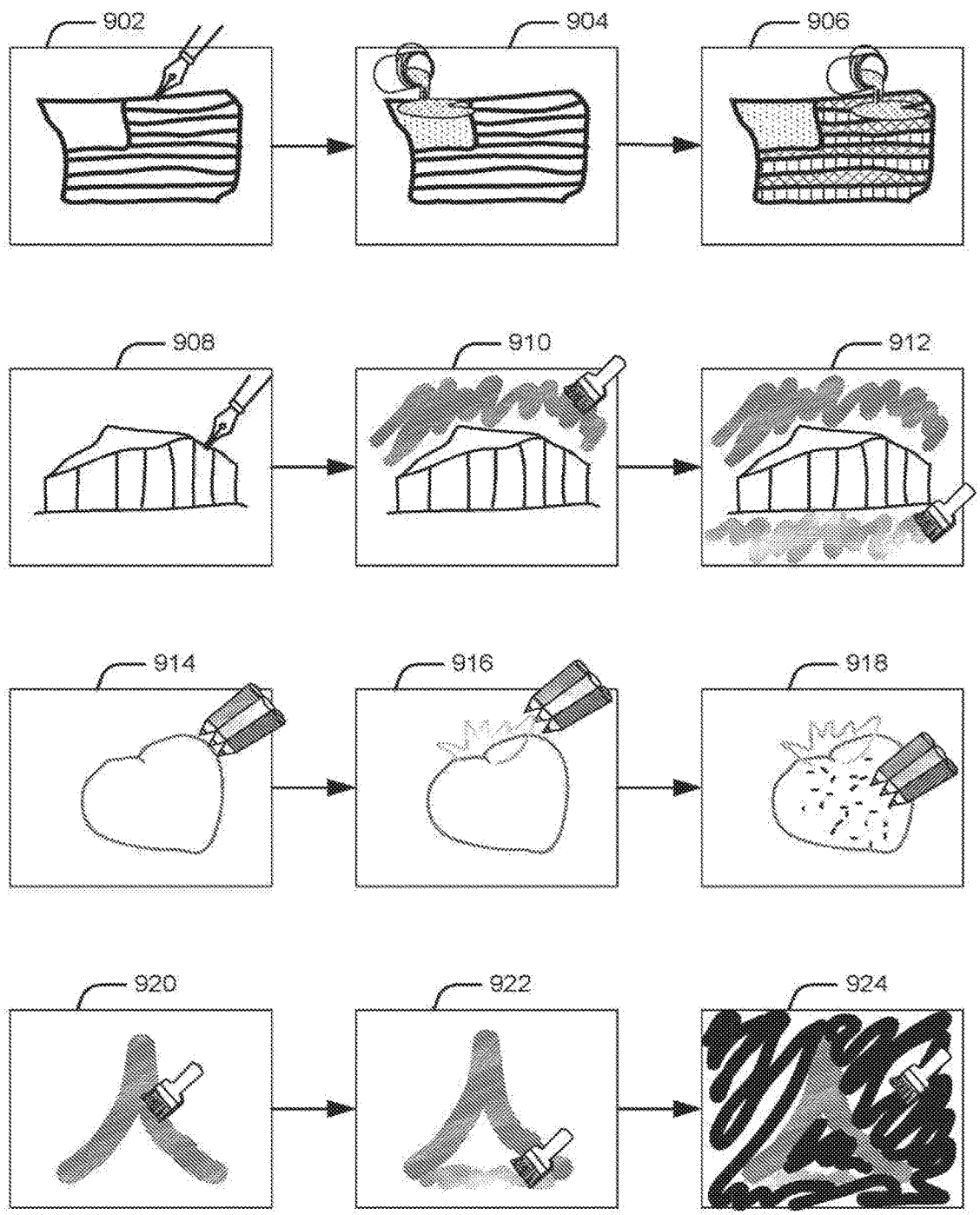
FIG. 9 is a pictorial diagram illustrating example query sketch generation.

FIG. 9 illustrates example query sketch generation. As a fast example, a sketch of an American flag may be generated using the binary pen 810 and the color bucket 814. In a first step, 902, using binary pen 810, a user draws a black outline of the flag. In a second step, 904, using color bucket 814, the user fills in the square portion of the flag with the color blue.

In third step, 906, using color bucket 814, the user fills in the stripes with the colors red and white.

As a second example, a sketch of a building is generated using the binary pen 810 and the color brush 816. In a first step 908, using binary pen 810, a user draws a black outline of a building. In a second step, 910, using color brush 816, the user adds a blue color to designate a background above the building. In a third step 912, using color brush 816, the user adds a green color to designate a foreground below the building.

As a third example, a sketch of a strawberry is generated using color pencil 812. In a first step 914, a user selects the color red, and draws an outline of a berry. In a second step 916, a user selects the color green, and draws an outline of leaves at the top of the berry. In a third step 918, a user selects a color yellow, and adds dots within the outline of the berry to represent the seeds.

As a fourth example, a sketch of the Eifel Tower at night is generated using color brush 816. In a first step 920, a user selects the color blue, and draws a triangular shape representing the Eifel Tower. In a second step 922, a user selects the color yellow, and draws a lighted area just below the tower. In a third step 924, a user selects the color black, fills the background to represent the night sky.

Example Operation

Figure 10:
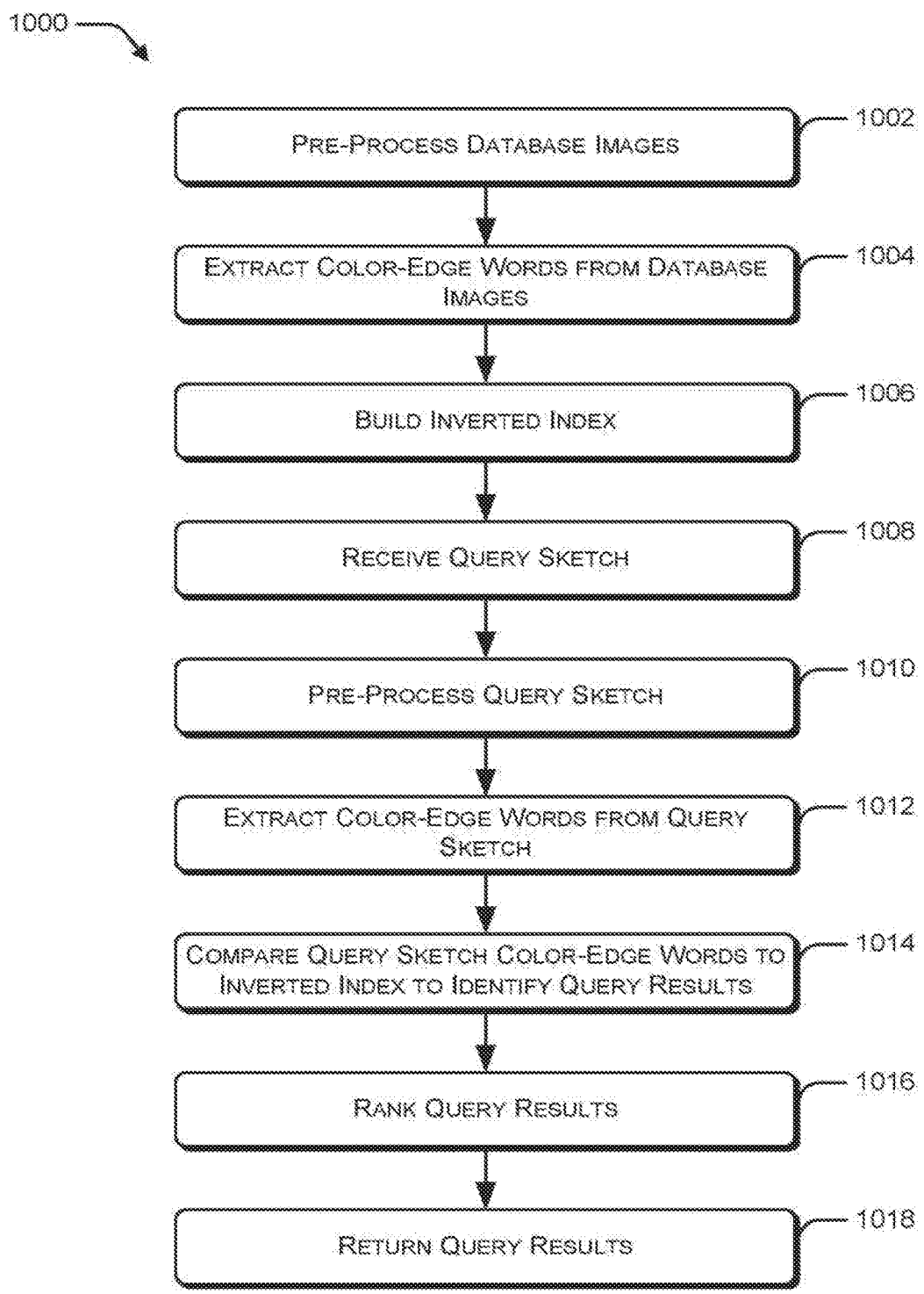
FIG. 10 is a flow diagram of an example process for color sketch image searching.
Figure 11:
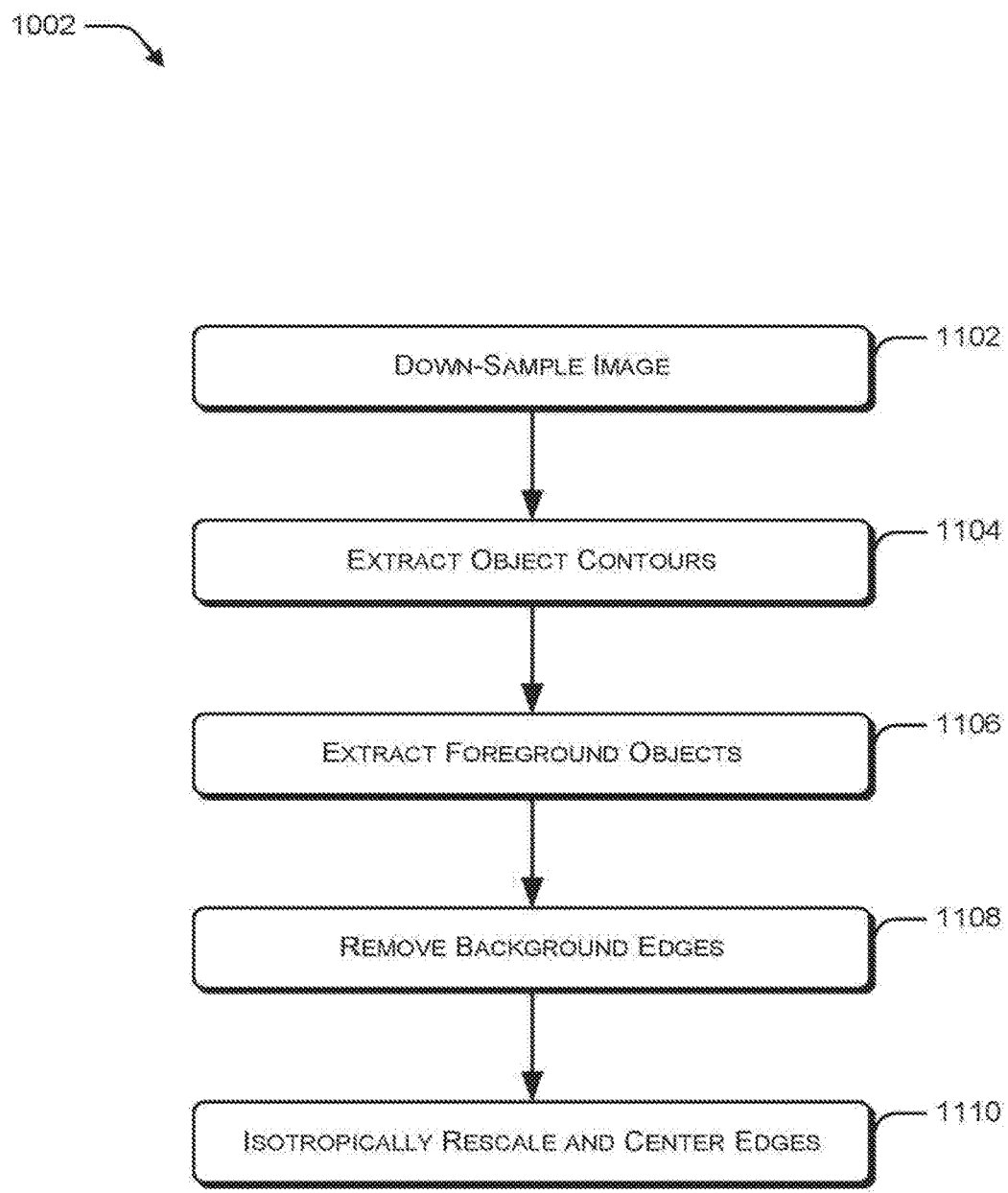
FIG. 11 is a flow diagram of an example process for pre-processing database images.
Figure 12:
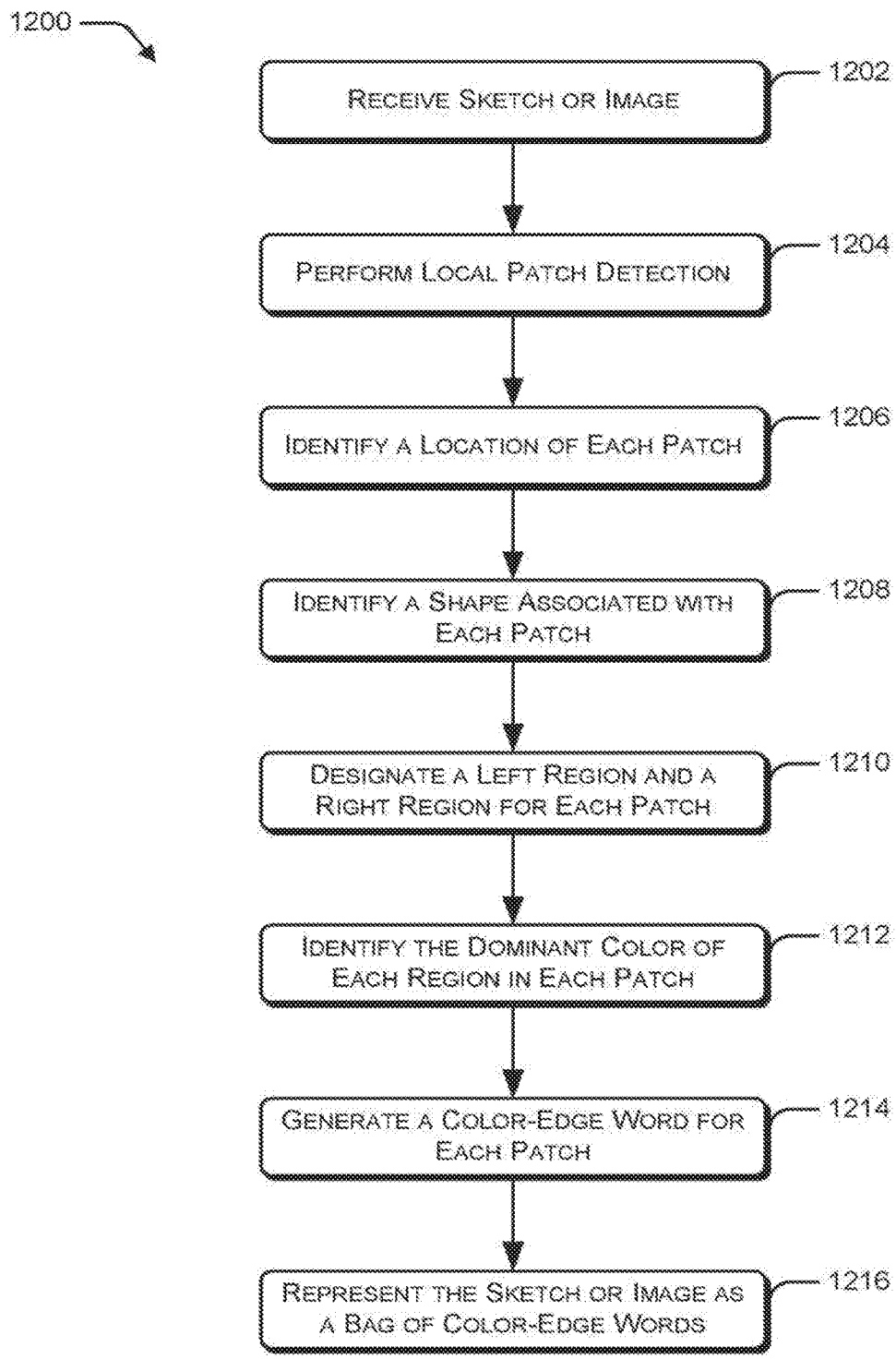
FIG. 12 is a flow diagram of an example process for generating a color-edge word representation of an image or sketch.

FIGS. 10-12 illustrate example processes for implementing color sketch image search as described herein. These processes are illustrated as collections of blocks in a logical flow graphs, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the described processes, or alternate processes. Additionally, individual blocks may be deleted from the processes without departing from the spirit and scope of the subject matter described herein. Furthermore, while these processes are described with reference to components of then computing environment 100 described above with reference to FIGS. 1 and 2, other computer architectures may implement one or more positions of these processes, in whole or in part.

FIG. 10 illustrates an example process 1000 for implementing color sketch image searching as described herein.

At block 1002, database images are pre-processed. As described above, color sketch image searching may be performed against any variety of image repositories, including, but not limited to, a clip art library, a photo library, or images available over the internet. Due to the wide variance that may exist among these images, image pre-processing module 142 pre-processes the images to convert each image to an edge map.

At block 1004, color-edge words are extracted from the database images. For example, color-edge word representation module 136 extracts color-edge words from the edge maps that were generated as described at block 1002. A process for extracting color-edge words from an image or sketch is described in further detail below with reference to FIG. 12.

At block 1006, an inverted index is built. For example, as described above with reference to FIG. 5 and FIG. 6, indexing module 140 builds an inserted index based on the color-edge words extracted from the database images.

At block 1008, a query sketch is received. For example, a user-generated query sketch is transmitted from browser application 118 to search engine 132 over the network 108.

At block 1010, the query sketch is pre-processed. For example, as described above with reference to FIG. 7, local patch detector 202 may perform color propagation, query dilation, and patch detection. As a result, multiple patches are identified within the search query, where each patch includes a contour fragment that divides the patch into two regions.

At block 1012, color-edge words are extracted from the query sketch. For example, for each patch, patch locator 204 determines location coordinates associated with the patch, shape detector 206 determines a shape from shape vocabulary 208 that represents the contour fragment of the patch, region designator 210 designates a "right region" and a "left region" of the patch, and color detector 212 analyzes the color of each region using color vocabulary 214 to determine the dominant color of each region. Based on this information, color-edge word generator 216 generates a color-edge word for each patch. A process for extracting color-edge words from an image or sketch is described in further detail below with reference to FIG. 12.

At block 1014, the color-edge words extracted from the query sketch are compared to the inverted index to identify query results. For example, as described above with reference to FIG. 5 and FIG. 6, matching module 138 calculates a similarity score for each database image in relation to the query sketch.

At block 1016, the query results are ranked. For example, as described above with reference to FIG. 5 and FIG. 6, matching module 138 ranks the query results according to the similarity scores.

At block 1018, the query results are returned. For example, search engine 132 returns a ranked list of images to browser application 118 over the network 108.

FIG. 11 illustrates an example process for pre-processing database images to convert each image to an edge map.

At block 1102, an image is down-sampled. For example, image pre-processing module 142 down-samples the image to enforce a maximum dimension.

At block 1104, object contours are extracted. For example, image pre-processing module 142 utilizes a canny edge detector to extract the major object contours.

At block 1106, foreground objects are extracted. For example, image pre-processing module 142 uses a saliency detector to extract the major foreground objects, resulting in a binary saliency map.

At block 1108, background edges are removed. For example, image pre-processing module 142 uses the binary saliency map as a map to remove the background edges.

At block 1110, edges are isotropically rescaled and positioned in the center. For example, image pre-processing module 142 rescales and repositions the remaining edges to provide scale and translation invariance for object retrieval.

FIG. 12 illustrates an example process 1200 for generating a color-edge word representation of an image or sketch.

At block 1202, a sketch or image is received. For example, an image from image repository 106 is accessed or a user-generated sketch is received.

At block 1204, local patch detection is performed. For example, local patches are identified along each continuous contour in the image. Each local patch is identified such that a fragment of the contour passes through the center of the patch and the ends of the contour fragment connect with the boundary of the patch. The contour fragment divides the patch into two regions, one on either side of the contour fragment.

At block 1206, a location of each patch is detected. For example, patch locator 204 determines (x, y) coordinates corresponding to the center of the patch.

At block 1208, a shape associated with each patch is identified. For example, shape detector 206 compares the contour fragment that passes through the center of the patch with shapes in shape vocabulary 208. The shape in shape vocabulary 208 that most closely resembles the contour fragment is selected as the shape to be associated with the patch.

At block 1210, a left region and right region is designated for each patch. For example, region designator 210 designates a region on one side of the contour fragment as a "left region" and designates the region on the other side of the contour fragment as a "right region". Additional details regarding an example process for determining which region is designated as the "left region" and which region is designated as the "right region" are described below with reference to FIG. 5.

At block 1212, the dominant color of each region in each patch is identified. For example, color detector 212 determines, for each region, a dominant color to be associated with the region.

Color detector 212 analyzes each region of the patch, and determines, for each region, the dominant color of the region. For example, color detector 212 may determine which of the 36 HSV bins is most similar to the region. The dominant color of the region may be determined, for example, based on an average color value of the region or based on the number of pixels within the region that correspond to each of the HSV bins, with the bin corresponding to the most pixels being selected as the dominant color for the region.

At block 1214, a color-edge word is generated for each patch. For example, color-edge word generator 214 combines the location, shape, left region color and right region color to form a color-edge word. In an example implementation, the color-edge word is represented by a quintuple (x, y, v, cL, cR) where x and y are the coordinates of the center of the patch within the image or sketch, v corresponds to the shape that represents the contour fragment that passes through the center of the patch, cL is the dominant color of the left region of the patch, and cR is the dominant color of the right region of the patch.

At block 1216, the sketch or image is represented as a bag of color-edge words. For example, the sketch or image is represented by the set of color-edge words generated for all of the patches identified for the sketch or image.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A system comprising:
   at least one processor; and
   memory including instructions that, when executed by the at least one processor, cause the at least one processor to perform operations to:
   present a search sketch user interface to a computing device, wherein the search sketch user interface includes drawing tools used to create a sketch that includes a contour;
   identify a fragment of the contour;
   determine a color-edge word for the sketch that includes a shape of the fragment, a color of a portion of the sketch on a first side of the fragment, and a color of a portion of the sketch on a second side of the fragment, and wherein the color of the portion of the sketch on the first side of the fragment is determined as a dominant color of a region on the first side of the fragment and the color of the portion of the sketch on the second side of the fragment is determined as a dominant color of a region on the second side of the fragment; and
   present a search results user interface to the computing device that includes an image result based on similarity between the color-edge word for the sketch and a color-edge word of the image result.

2. The system of claim 1, wherein the sketch comprises any combination of one or more of:
   lines generated by a binary pen tool of the drawing tools;
   lines generated by a color pencil tool of the drawing tools;
   an area of color generated by a color bucket tool of the drawing tools; or
   an area of color generated by a color brush tool of the drawing tools.

3. The system of claim 1, further comprising instructions to:
   define the color-edge word of the image result to represent a location within the image result, a shape of a contour fragment located at the location, a color of a portion of the image result to a first side of the contour fragment, and a color of a portion of the image result to a second side of the contour fragment; and
   adding the color-edge word to a second set of color-edge words.

4. The system of claim 3, further comprising instructions to:
   add the color-edge word for the sketch to a first set of color-edge words;
   calculate a match value as a number of color-edge words in the second set of color-edge words that match a color-edge word in the first set of color-edge words; and
   calculate a similarity of the image result to the sketch by dividing the match value by a total number of color-edge words in the second set of color-edge words.

5. The system of claim 4, further comprising instructions to:
   calculate a similarity of each of a plurality of images to the sketch;
   rank the plurality of images based on the similarity that is calculated; and
   display one or more of the plurality of images based on the rank in the search results user interface.

6. The system of claim 5, wherein the one or more of the plurality of images is displayed in the search results user interface in an order based on the ranking.

7. The system of claim 1, wherein the fragment is identified as a particular patch along the contour within the sketch.

8. The system of claim 7, wherein a location of the particular patch is determined using coordinates of the particular patch.

9. The system of claim 1, wherein the shape of the fragment is determined by comparison of the fragment to shapes included in a shape vocabulary, wherein the shape is selected based on the contour most closely resembling the shape.

10. At least one computer readable storage device comprising instructions that, when executed by at least one processor, cause the at least one processor to perform operations to:
present a search sketch user interface to a computing device, wherein the search sketch user interface includes drawing tools used to create a sketch that includes a contour;
identify a fragment of the contour;
determine a color-edge word for the sketch that includes a shape of the fragment, a color of a portion of the sketch on a first side of the fragment, and a color of a portion of the sketch on a second side of the fragment, and wherein the color of the portion of the sketch on the first side of the fragment is determined as a dominant color of a region on the first side of the fragment and the color of the portion of the sketch on the second side of the fragment is determined as a dominant color of a region on the second side of the fragment; and
present a search results user interface to the computing device that includes an image result based on similarity between the color-edge word for the sketch and a color-edge word of the image result.

11. The at least one computer readable storage device of claim 10, wherein the sketch comprises any combination of one or more of:
lines generated by a binary pen tool of the drawing tools;
lines generated by a color pencil tool of the drawing tools;
an area of color generated by a color bucket tool of the drawing tools; or
an area of color generated by a color brush tool of the drawing tools.

12. The at least one computer readable storage device of claim 10, further comprising instructions to:
define the color-edge word of the image result to represent a location within the image result, a shape of a contour fragment located at the location, a color of a portion of the image result to a first side of the contour fragment, and a color of a portion of the image result to a second side of the contour fragment; and
adding the color-edge word to a second set of color-edge words.

13. The at least one computer readable storage device of claim 12, further comprising instructions to:
add the color-edge word for the sketch to a first set of color-edge words;
calculate a match value as a number of color-edge words in the second set of color-edge words that match a color-edge word in the first set of color-edge words; and
calculate a similarity of the image result to the sketch by dividing the match value by a total number of color-edge words in the second set of color-edge words.

14. The at least one computer readable storage device of claim 13, further comprising instructions to:
calculate a similarity of each of a plurality of images to the sketch;
rank the plurality of images based on the similarity that is calculated; and
display one or more of the plurality of images based on the rank in the search results user interface.

15. A method comprising:
presenting a search sketch user interface to a computing device, the search sketch user interface including drawing tools used to create a sketch including a contour;
identifying a fragment of the contour;
determining a color-edge word for the sketch including a shape of the fragment, a color of a portion of the sketch on a first side of the fragment, and a color of a portion of the sketch on a second side of the fragment, and wherein the color of the portion of the sketch on the first side of the fragment is determined as a dominant color of a region on the first side of the fragment and the color of the portion of the sketch on the second side of the fragment is determined as a dominant color of a region on the second side of the fragment; and
presenting a search results user interface to the computing device including an image result based on similarity between the color-edge word for the sketch and a color-edge word of the image result.

16. The method of claim 15, wherein the sketch comprises any combination of one or more of:
lines generated by a binary pen tool of the drawing tools;
lines generated by a color pencil tool of the drawing tools;
an area of color generated by a color bucket tool of the drawing tools; or
an area of color generated by a color brush tool of the drawing tools.

17. The method of claim 15, further comprising:
defining the color-edge word of the image result to represent a location within the image result, a shape of a contour fragment located at the location, a color of a portion of the image result to a first side of the contour fragment, and a color of a portion of the image result to a second side of the contour fragment; and
adding the color-edge word to a second set of color-edge words.

18. The method of claim 17, further comprising:
adding the color-edge word for the sketch to a first set of color-edge words;
calculating a match value as a number of color-edge words in the second set of color-edge words that match a color-edge word in the first set of color-edge words; and
calculating a similarity of the image result to the sketch by dividing the match value by a total number of color-edge words in the second set of color-edge words.

* * * * *